United States Patent [19]

Lerminiaux

[11] Patent Number: 5,559,913
[45] Date of Patent: Sep. 24, 1996

[54] BROADBAND INTEGRATED OPTICAL PROXIMITY COUPLER

[75] Inventor: Christian Lerminiaux, Fontainebleau, France

[73] Assignee: Corning Incorporated, Corning, N.Y.

[21] Appl. No.: 380,748

[22] Filed: Jan. 30, 1995

[30] Foreign Application Priority Data

Feb. 3, 1994 [EP] European Pat. Off. ............ 94400230

[51] Int. Cl.⁶ ...................................................... G02B 6/26
[52] U.S. Cl. .............................. 385/43; 385/14; 385/15; 385/40; 385/41; 385/42; 385/49; 385/132
[58] Field of Search ................................... 385/2, 14, 15, 385/16, 39, 40, 41, 42, 43, 49, 132

[56] References Cited

U.S. PATENT DOCUMENTS

3,850,503  11/1974  Riseberg et al. ...................... 385/14 X
5,165,001  11/1992  Takagi et al. ............................ 385/42

FOREIGN PATENT DOCUMENTS

0484227A1  5/1992  European Pat. Off. ............. 385/11 X
900172645  2/1992  Japan ................................... 385/14 X

OTHER PUBLICATIONS

Adar et al., "Adiabatic 3–db Couplers, Filters and Multiplexers made with Silica waveguidess waveguides on Silicon", Journ. of Lightwave Tech. vol. 10, No. 1, Jan. 1992, pp. 46–50.

Cai et al., "Analysis of the Coupling Characteristics of a Tapered Three–Guide Coupled System", Journal of Lightwave Tech., Vol. 8, No. 10, Oct. 1990, pp. 1621–1629.

Cai et al., "Analysis of the Coupling Characteristics of a Tapered Coupled waveguide System", Journal of Lightwave Tech., vol. 8, No. 1, Jan. 1990, pp. 90–98.

Okamura et al., "Characteristics of Guided–Wave Asymmetric Directional Coupler .. . "Proc. of the Eur. Conf. on Optical Comm. 1991, vol. 1, Sep. 1991, pp. 317–320.

Takagi et al., "Broadband Silica–Based Optical Waveguide Coupler with Asymmetric Structure", Electronics Lett., Vol. 26, No. 2, Jan. 1990, pp. 132–133.

Takagi et al., "Wavelength Characteristics of (2×2) Optical Channel–Type Directional Couplers . . . "Journal of Lightwave Tech. vol. 10, No. 6, Jun. 1992, pp. 735–745.

*Primary Examiner*—Brian Healy
*Attorney, Agent, or Firm*—William J. Simmons, Jr.

[57] ABSTRACT

An integrated optical proximity coupler comprises first and second parallel straight interaction waveguide segments. First and second end segments are connected to the input ends of the first and second straight waveguide segments, respectively, by means including first and second curved segments, respectively. The end segments are both the same predetermined size which is determined by conventional optical fibers to which they are to be connected. To make the device broad banded, one of the straight segments must be narrower than the other. To reduce device excess loss, the first straight segment and at least part of its respective curved segment are made slightly narrower than the end segments, and the second straight segment and at least part of its respective curved segment are made slightly wider than the end segments. Thus, the required $\Delta\beta$ can be obtained without making the narrow path too narrow.

20 Claims, 2 Drawing Sheets

BROADBAND INTEGRATED OPTICAL PROXIMITY COUPLER

BACKGROUND OF THE INVENTION

The present invention relates to an optical device for proximity coupling between two waveguides integrated in a substrate, and more particularly, to such a device which is characterized by low loss, broadbanded operation and which possesses acceptable cutoff wavelength characteristics.

Cost reductions in optical networks can be obtained by sharing the fiber among multiple subscribers. The ion-exchange technique, for example, has proved to be a promising technology for producing 1×N splitters with output ports numbering as high as 16. Such devices, when formed as Y junctions, provide excellent achromaticity and uniformity at low loss.

The ability to provide a second input to a system is becoming more desirable for various reasons such as (a) the multiplexing of two different signals; (b) redundancy in different paths to reach a splitting point; (c) flexibility in the future deployment of the network; and (d) providing a network testing entry point. Junctions which can provide a second input, a 2×2 junction, for example, are more difficult to realize than a 1×2 junction, when using planar Y junction technology. The combination of two Y junctions, one to provide a second input to a 1×N splitter, results in a 3 dB additional loss; such high loss is unacceptable.

Therefore, interferometric devices have been employed for combining signals in integrated circuits. FIG. 1 shows a symmetrical waveguide coupler 10 which functions as a wavelength division multiplexer (WDM) for the combining/separating of two signals of different wavelengths. It comprises two straight parallel waveguides 11 and 12 and curved approach segments 13, 14, 15 and 16, the ends of which are referred to as input/output ports. The ports are separated by a distance fixed by the diameter of coated optical fibers 19–22 which are attached to these ports by a technique of "pigtailing", for example.

A broadbanded optical waveguide coupler is disclosed in the publication, A. Takagi et al. "Broadband Silica-Based Optical Waveguide Coupler with Asymmetric Structure", Electronics Letters, 18 Jan. 1990, Vol 26, No. 2, pp. 132–133. The device is made broadbanded by forming the two paths such that they have different propagation constants in the coupling region. Referring to FIG. 1, propagation constants are made different by changing the width of one of the waveguide paths. Straight waveguide 11 and segments 13 and 15 remain the same width as they were in the WDM coupler, but waveguide 12' is narrower than waveguide 11, approach segments 14 and 16 being tapered from standard width at the input and output ports to the narrower width at waveguide 12'.

In a $\Delta\beta$ proximity coupler the power transferred from one waveguide to the other is given by $$P_{1-2} = F^2 \sin^2\left(\frac{C}{F} L\right)$$

where L is the length of the interaction, C is the coupling constant, and F depends upon $\Delta\beta$, the difference between the propagation constants $\beta_1$ and $\beta_2$ of the two waveguides, and is given by $$F = 1 + \left[\frac{(\beta_1 - \beta_2)^2}{4c^2}\right]^{-1/2}$$

In order to make a 3 dB coupler, it can be shown that the wavelength response of the proximity coupler is flattened to a maximum extent when $F^2$ equals ½ and L is chosen in such a way that CL/F equals $(2n+1)\Pi/2$. Incomplete power transfer occurs, whereby output power as a function of wavelength is flatter.

The $\Delta\beta$ coupler of the Takagi et al. publication is formed by a combination of flame hydrolysis deposition of $SiO_2$ on Si, photolithography, and reactive ion etching. A relatively small excess loss is induced in the curved portions of the narrowed approach segments 14' and 16' because of their reduced diameter.

The ion-exchange process is different from flame hydrolysis or other planar techniques in that it is impossible to reduce the width of an ion-exchange waveguide path without reducing its maximum index of refraction. Therefore the effective index of the narrower path is reduced by both (a) the narrowing of the path width and (b) the diminution of the refractive index. When ion-exchange technology is used to form the waveguide paths in a $\Delta\beta$ proximity coupler, both effects (a) and (b) will increase the effective index difference between the two paths (and thus the $\Delta\beta$), and both effects will also increase the losses in the bend approach region.

SUMMARY OF THE INVENTION

It is therefore an object of the present invention to provide an improved integrated optical proximity coupler. A further object is to provide a broadbanded integrated optical proximity coupler that exhibits low loss and exhibits desired cutoff wavelength properties.

Briefly, the present invention relates to an integrated optical device for proximity coupling between two waveguides. The device comprises first and second waveguide input end segments having the same width. First and second straight interaction waveguide segments are parallel and near to one another. The first straight segment is narrower than the first and second input end segments, and the second straight segment is wider than the first and second input end segments. The spacing between the first and second straight interaction segments is less than the spacing between the first and second input end segments. First input means connects the first input end segment to the first straight segment, and second input means connects the second end segment to the second straight segment. Output means couples a signal from one of the first and second straight paths.

DESCRIPTION OF THE PREFERRED EMBODIMENTS

The drawings are not intended to indicate scale or relative proportions of the elements shown therein.

Figure 1:
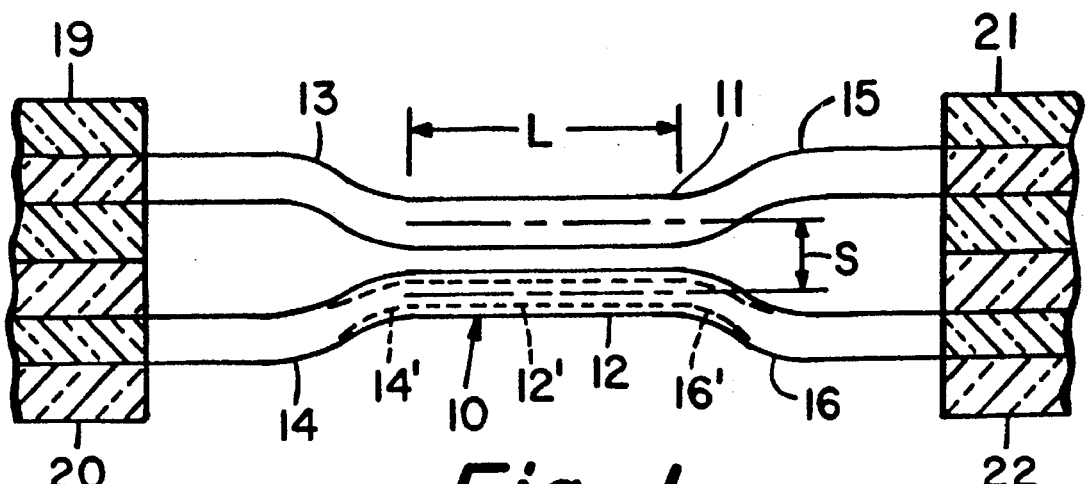
FIG. 1 is a schematic illustration of a prior art asymmetric integrated optical proximity coupler.
Figure 2:
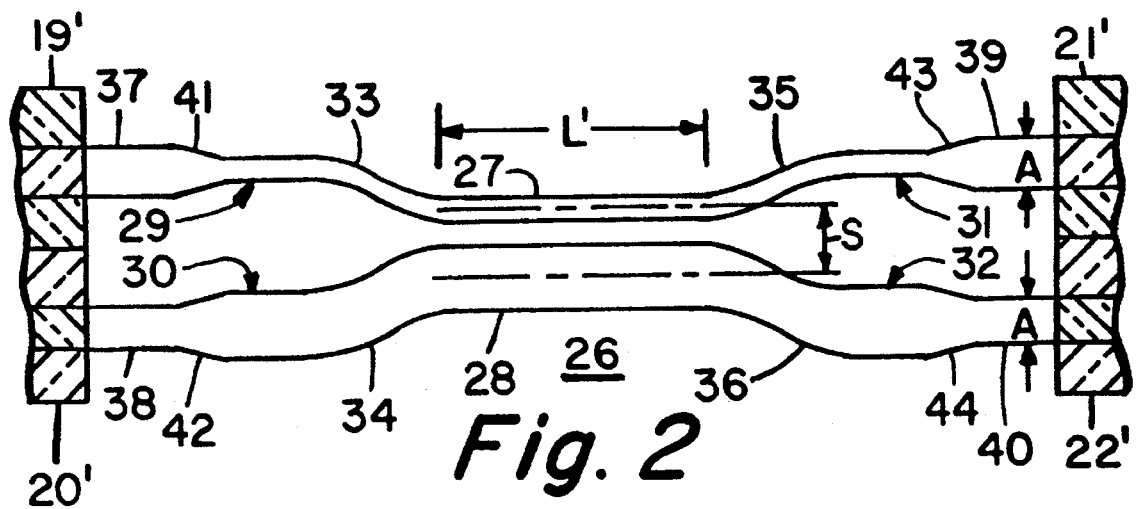
FIG. 2 is a schematic illustration of an asymmetric integrated optical proximity coupler formed in accordance with the present invention.

The improved Δβ coupler 26 of the present invention is shown in FIG. 2. The coupler comprises two straight parallel waveguides 27 and 28 and approach segments 29, 30, 31 and 32. Approach segments 29 and 31, which are connected to straight segment 27, comprise curved segments 33 and 35, respectively, which are connected to end segments 37 and 39, respectively, by transition segments 41 and 43, respectively. Approach segments 30 and 32, which are connected to straight segment 28, comprise curved segments 34 and 36, respectively, which are connected to end segments 38 and 40, respectively, by transition segments 42 and 44, respectively. The transition segments are needed to provide low loss connections between the waveguide paths of the coupler to optical fibers. Whereas the transition segments are located immediately adjacent the end segments in FIG. 2, they could be located along the lengths of the curved segments as shown in FIG. 1. However, locating a transition segment in a curved region can increase loss.

Straight waveguide segment 27 is narrower than end segments 37 and 39. To reduce excess loss, narrower path 27 is not made quite as narrow as it was in the prior art (see FIG. 1). This is accomplished by making the other straight waveguide path 28 slightly wider than end segments 38 and 40. Thus, the required Δβ can be achieved without making path 27 so narrow that its width and reduced refractive index excessively increase excess loss.

As the width of straight segment 28 increases, its cutoff wavelength increases. The standard cutoff wavelength of the second mode is around 1200 nm. A 1.0 μm difference in path width will result in a 200 nm shift in cutoff wavelength. The wider path 28 cannot be not made so wide that it's cutoff wavelength exceeds the wavelength of operation, since some noise or losses due to the injection of power into the second order mode is possible. The difference between the propagation constants of the two coupled waveguides is therefore obtained by a reasonable change in width of both waveguides, as compared to a standard narrow band coupler having straight paths of equal widths.

If the end segments have a path width between about 2 μm and 4 μm, segments 27 and 28 will normally differ in width from the end segment width by about 0.2 μm to 0.5 μm.

For Δβ couplers made in accordance with this invention, S' is typically between 9 μm and 12 μm, and L' is between 500 μm and 2000 μm to have 3 dB splitting ratio at 1.3 and 1.55 nm. The distance L' is the length of the coupling region, and S' is the distance from the center of one waveguide to the center of the other waveguide.

Tapered segments 41–44 have been made as long as 1 mm, but lengths as short as 100 μm have performed satisfactorily. Longer tapers merely unduly lengthen the device.

Figure 5:
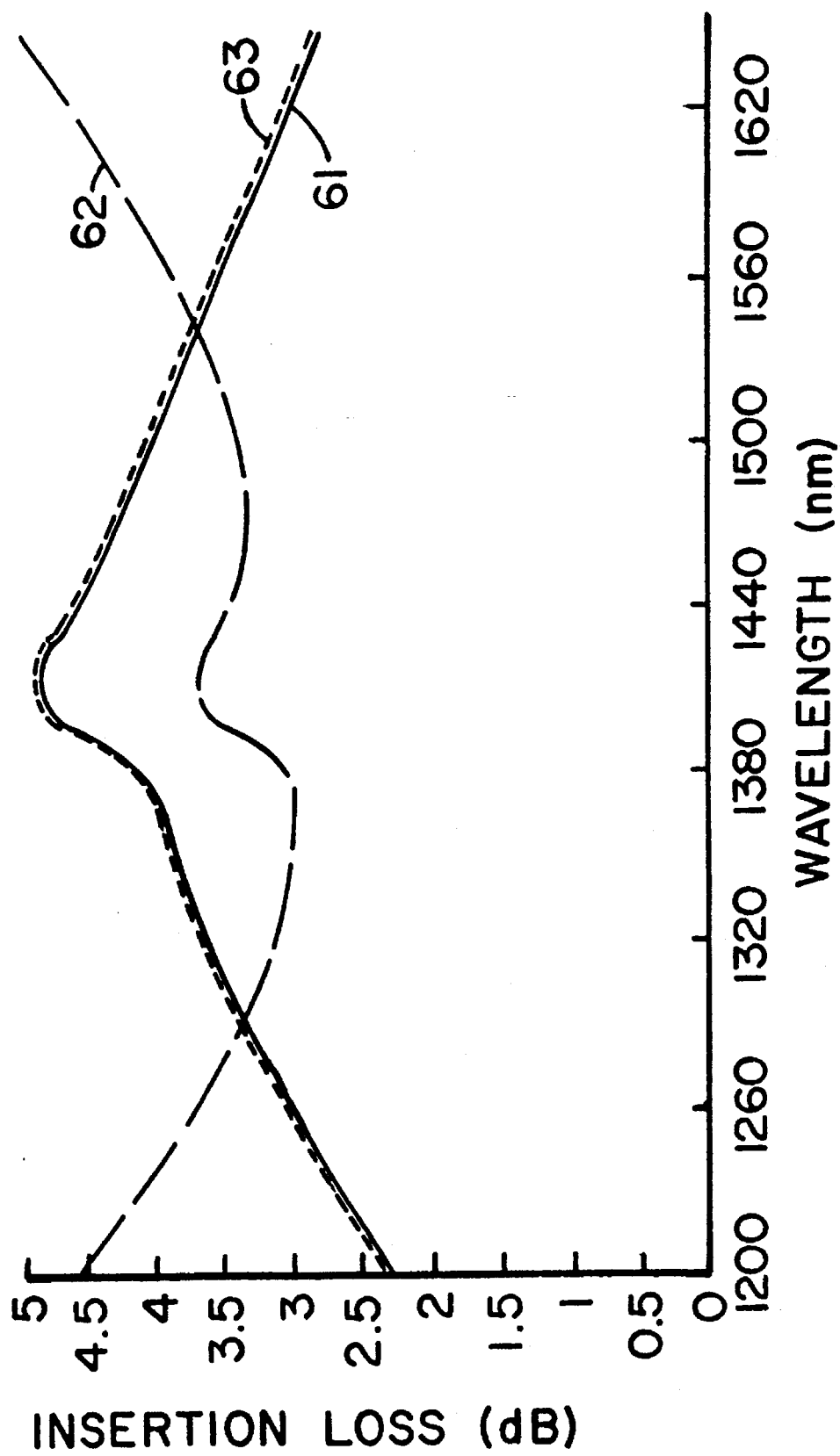
FIG. 5 is a graph showing insertion loss plotted as a function of wavelength.

In a specific example, the device was constructed by an ion-exchange process. Examples of methods and apparatus for forming by ion-exchange an optical waveguide path in the surface of a glass substrate and the subsequent burying of that path can be found in U.S. Pat. Nos. 3,836,348; 4,765,702; 4,842,629; 4,913,717; and 4,933,262. Also see publications: R. V. Ramaswamy et al. "Ion-Exchanged Glass Waveguides: A Review", Journal of Lightwave Technology, Vol. 6, No. 6, June 1988, pp. 984–1002; H. J. Lilienhof et al. "Index Profiles of Multimode Optical Strip Waveguides by Field Enhanced Ion Exchange in Glasses", Optics Communications, Vol. 35, No. 1, October, 1980, pp. 49–53; and A. Miliou et al. "Fiber-Compatible $K^+$-$Na^+$ Ion-Exchanged Channel Waveguides: Fabrication and Characterization", IEEE Journal of Quantum Electronics, Vol. 25, No. 8, August, 1989, pp 1889–1897. The substrate was formed of an alumino borosilicate glass containing sodium and potassium ions. Its refractive index was 1.463. The exchanged ion that formed the waveguide paths was thallium. The width of the mask apertures for paths 27, 33 and 35 was 2.6 μm. The width of the mask apertures for paths 28, 34 and 36 was 3.2 μm. The width of the mask apertures for paths 37, 38, 39 and 40 was 2.9 μm. There is a direct correlation between mask aperture width and index profile radius or waveguide path width. The cross-sectional shape of the high index waveguide is somewhat circular, the profile being diffused. The dimensions L' and S' were 1000 μm and 11.5 μm, respectively. FIG. 5 shows the insertion loss for this coupler. Curve 61 represents the output signal at segment 39 when the input signal is applied at segment 37. Curve 62 represents the output signal at segment 40 when the input signal is applied at segment 37. Curve 63 represents the output signal at segment 40 when the input signal is applied at segment 38. Insertion loss is 3.3 dB±0.5 dB in the first window (1260 to 1360 nm) and 3.7 dB±0.5 dB in the second window (1480 to 1580 nm). The average excess loss is therefore of the same level as for a standard WDM coupler.

Figure 3:
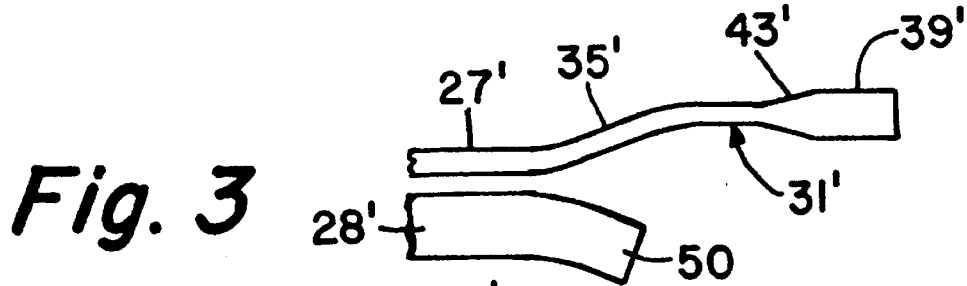
FIGS. 3 and 4 are schematic illustrations of two different modifications of the output end of the device of FIG. 2.
Figure 4:
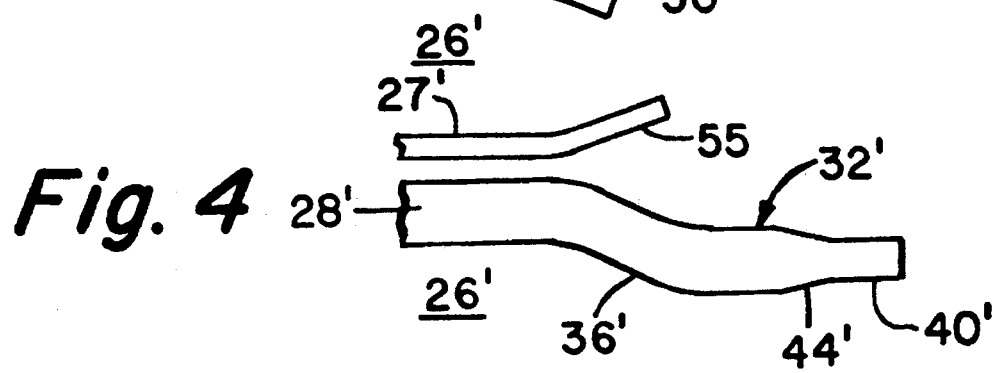

If the device is used only for combining two signals, it need not have an output segment connected to both straight segments 27 and 28. Examples are shown in FIGS. 3 and 4 wherein elements similar to those of FIG. 2 are represented by primed reference numerals. In FIGS. 3 and FIG. 4, curved segments 36 and 35, respectively, are replaced by termination segments 50 and 55, respectively.

I claim:

1. An integrated optical device for proximity coupling between two waveguides comprising first and second waveguide input end segments (37, 38) waving the same width, first and second straight interaction waveguide segments (27, 28) that are parallel and near to one another, said first straight segment (27) being narrower than said first and second input end segments (37, 38), said second straight segment (28) being wider than said first and second input end segments (37, 38), the spacing between said first and second straight interaction waveguide segments (27, 28) being less than the spacing between said first and second waveguide input end segments (37, 38), first input means (29) for connecting said first input end segment (37) to said first straight segment (27), second input means (30) for connecting said second input end segment (38) to said second straight segment (28), and output means (31, 32) for coupling a signal from one of said first and second straight paths (27, 28).

2. An optical device in accordance with claim 1 wherein said first input means (29) comprises a first curved segment (33) connected between said first straight segment (27) and said first input end segment (37), a first tapered transition segment (41) being located within said first input means (29), and wherein said second input means (30) comprises a second curved segment (34) connected between said second straight segment (28) and said second input end segment (38), a second tapered transition segment (42) being located within said second input means (30).

3. An optical device in accordance with claim 2 wherein said first and second tapered segments (41, 42) are located immediately adjacent said first and second input segments (37, 38), respectively.

4. An optical device in accordance with claim 2 wherein said first and second tapered segments (41, 42) are located along the lengths of said first and second curved segments (33, 34), respectively.

5. An optical device in accordance with claim 1 wherein said output means (31, 31') comprises a third end segment (39, 39') and a third curved segment (35, 35') connected between an output end of said first straight segment (27, 27') and said third end segment (39, 39').

6. An optical device in accordance with claim 1 wherein said output (32, 32') means comprises a fourth end segment (40, 40') and a fourth curved segment (36, 36') connected between an output end of said second straight segment (28, 28') and said fourth end segment (40, 40').

7. An optical device in accordance with claim 1 wherein said output means (31, 32) comprises third and fourth end segments (39, 40), a third curved segment (35) connected between an output end of said first straight segment (27) and said third end segment (39), and a fourth curved segment (36) connected between an output end of said second straight segment (28) and said fourth end segment (40).

8. An optical device in accordance with claim 1 wherein said output means is an optical fiber (21', 22') that is connected by a waveguide path to one of said first and second straight segments (27, 28).

9. An optical device in accordance with claim 1 wherein said output means (31, 31') comprises a third end segment (39, 39') connected by a third curved segment (35, 35') to an output end of said first straight segment (27, 27'), and an optical fiber (21') disposed axially with respect to said third end segment (39, 39').

10. An optical device in accordance with claim 1 wherein said output means (32, 32') comprises a fourth end segment (40, 40') connected by a fourth curved segment (36, 36') to an output end of said second straight segment (28, 28'), and an optical fiber (22, 22') disposed axially with respect to said fourth end segment (40, 40').

11. An optical device in accordance with claim 1 wherein said output means (31, 32) comprises a third end segment (39) connected by a third curved segment (35) to an output end of said first straight segment (27), a first output optical fiber (21') disposed axially with respect to said third end segment (39), and a fourth end segment (40) connected by a fourth curved segment (36) to an output end of said second straight segment (28), a second output optical fiber (22') disposed axially with respect to said fourth end segment (40).

12. An optical device in accordance with claim 1 wherein said segments are formed by an ion-exchange process.

13. An integrated optical device for proximity coupling between two waveguides comprising first and second straight interaction waveguide segments (27, 28) that are parallel and near to one another, a first approach segment connected to an input end of said first straight waveguide segment (27), said first approach segment including a first end segment (37) connected to said first straight segment by a first curved segment (33), a second approach segment connected to an input end of said second straight waveguide segment (28), said second approach segment including a second end segment (38) connected to said second straight segment (28) by a second curved segment (34), said first and second end segments (37, 38) having the same width, the spacing between said first and second straight segments (27, 28) being less than the spacing between said first and second waveguide input end segments (37, 38), said first curved segment (33) and said first straight segment (27) being narrower than said first and second end segments (37, 38), said second curved segment (34) and said second straight segment (38) being wider than said first and second end segments (37 38), and output means (31, 32) for coupling a signal from one of said first and second straight segments (27, 28) to an output device.

14. An optical device in accordance with claim 13 wherein said output means comprises an optical fiber (21', 22').

15. An optical device in accordance with claim 13 wherein said output means (31, 31') comprises a third end segment (39, 39') and a third curved segment (35, 35') connected between an output end of said first straight segment (27, 27') and said third end segment (39, 39').

16. An optical device in accordance with claim 13 wherein said output means (32, 32') comprises a fourth end segment (40, 40') and a fourth curved segment (36, 36') connected between an output end of said second straight segment (28, 28') and said fourth end segment (40, 40').

17. An optical device in accordance with claim 13 wherein said output means (31, 32) comprises third and fourth end segments (39, 40), a third curved segment (35) connected between an output end of said first straight segment (27) and said third end segment (39), and a fourth curved segment (36) connected between an output end of said second straight segment (28) and said fourth end segment (40).

18. An optical device in accordance with claim 13 wherein said output means (31, 31') comprises a third end segment (39, 39') connected by a third curved segment (35, 35') to an output end of said first straight segment (27, 27'), and an optical fiber (21') disposed axially with respect to said third end segment (39, 39').

19. An optical device in accordance with claim 13 wherein said output means (32, 32') comprises a fourth end segment (40, 40') connected by a fourth curved segment (36, 36') to an output end of said second straight segment (28, 28'), and an optical fiber (22') disposed axially with respect to said fourth end segment (40, 40').

20. An optical device in accordance with claim 13 wherein said segments are formed by an ion-exchange process.

* * * * *